US012529663B2

(12) United States Patent
Nattar Ranganathan et al.

(10) Patent No.: US 12,529,663 B2
(45) Date of Patent: Jan. 20, 2026

(54) MONITORING PRODUCE QUALITY IN THE SUPPLY CHAIN AT THE PALLET LEVEL WITH WIRELESS SIGNALS

(71) Applicant: Microsoft Technology Licensing, LLC, Redmond, WA (US)

(72) Inventors: Vaishnavi Nattar Ranganathan, Seattle, WA (US); Ranveer Chandra, Kirkland, WA (US); Nakul Garg, College Park, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 18/499,059

(22) Filed: Oct. 31, 2023

(65) Prior Publication Data
US 2025/0137940 A1 May 1, 2025

(51) Int. Cl.
*G01N 22/00* (2006.01)
*G06Q 10/087* (2023.01)

(52) U.S. Cl.
CPC .......... *G01N 22/00* (2013.01); *G06Q 10/087* (2013.01)

(58) Field of Classification Search
CPC .............................. G01N 22/00; G06Q 10/087
USPC ........................................................ 324/639
See application file for complete search history.

(56) References Cited

U.S. PATENT DOCUMENTS

| 2016/0275429 | A1* | 9/2016 | Purcell | G06Q 10/06315 |
| 2017/0323412 | A1* | 11/2017 | Muirhead | G06F 16/258 |
| 2019/0220689 | A1* | 7/2019 | Mehring | G06Q 10/087 |
| 2020/0111033 | A1* | 4/2020 | Mahajan | G06Q 10/04 |
| 2021/0081966 | A1* | 3/2021 | Whitman | G06Q 50/02 |
| 2023/0244896 | A1* | 8/2023 | Leitermann | G06K 7/10445 235/385 |

OTHER PUBLICATIONS

"Food Waste FAQs", Retrieved from: https://www.usda.gov/foodwaste/faqs, Retrieved Date: Sep. 5, 2023, 05 Pages.

* cited by examiner

*Primary Examiner* — Raul J Rios Russo
(74) *Attorney, Agent, or Firm* — NovoTechIP International PLLC

(57) ABSTRACT

A data processing system implements transmitting an RF signal using a transmitter disposed at a first side of a produce container containing produce to be monitored for quality. The signal is transmitted on multiple frequencies. The system further implements receiving the signal using a receiver disposed at a second side of the produce container opposite the first side of the produce container so the signal passes through the produce; obtaining a sample signal output by the receiver responsive to receiving the signal that passed through the produce contained in the produce container; analyzing the sample signal to identify differences between the RF signal and the sample signal representative of the dielectric properties of the produce; determining an estimated quality level of the produce based on the differences between the RF signal and the sample signal; and outputting an indication of the estimated quality level of the produce.

20 Claims, 15 Drawing Sheets

MONITORING PRODUCE QUALITY IN THE SUPPLY CHAIN AT THE PALLET LEVEL WITH WIRELESS SIGNALS

BACKGROUND

Food wastage is a massive, world-wide problem. Approximately forty percent of the food produced across the world is wasted post-harvest. The primary reason leading to this wastage is the inability to track the quality of food at scale to ensure that the food reaches consumers while still in good quality. Current shelf-life indicators on produce can be particularly confusing for consumers, with indicators such as best-by, sell-by, or use-by dates being poorly defined. Consequently, consumers often struggle to understand the shelf life of produce based on current the commonly used shelf-life indicators. Inefficiencies in the supply chain also can lead to wastage when produce spends prolonged periods at various points along the supply chain, which leads to spoilage and decreased nutritional content in the produce. Quality testing is performed along the supply chain to try to identify produce that has or is about to spoil and to expedite the usage of produce that is closest to expiring. However, the current quality testing techniques are inefficient and/or expensive and involve sparse sampling of produce that is often not reflective of the quality of the pallets or larger quantities of produce. One current quality testing technique is visual inspection of the produce to deduce pallet-level quality. This approach is prone to human error and involves significant manual labor. Furthermore, the inspectors can only visually inspect the produce that is visible. Other produce in the pallet may have different levels of ripeness and quality that can be easily missed by visual inspection. Another current quality testing technique is lab testing to understand the quality and nutritional level of the produce. Lab testing is expensive and is typically performed by large farms and distributors for quality certification. Lab testing is also both time consuming and provides sparse sampling. The lab tests are typically destructive, rendering the produce that is testing unsuitable for consumption. Yet another current quality testing technique is the use of hand-held spectrum analyzers to perform non-destructive testing of produce quality. Such devices are easy to use and portable. However, these devices are expensive and can test only a signal fruit at a time. Testing an entire pallet of fruit would be a time consuming and manually intensive process. Consequently, the testing performed using such devices is also too sparse. Hence, there is a need for improved systems and methods for monitoring the state of produce at the post-harvest stage to reduce food wastage.

SUMMARY

An example data processing system according to the disclosure includes a processor and a machine-readable medium storing executable instructions. The instructions when executed cause the processor alone or in combination with other processors to perform operations including transmitting a radio frequency (RF) signal using an RF transmitter disposed at a first side of a produce container, the produce container containing produce to be monitored for quality, and the RF signal being transmitted on a plurality of frequencies; receiving the RF signal using an RF receiver disposed at a second side of the produce container, the second side being opposite the first side of the produce container, the RF signal having passed through at least a portion of the produce contained in the produce container; obtaining a sample signal output by the RF receiver responsive to receiving the RF signal having passed through the at least a portion of the produce contained in the produce container; analyzing the sample signal to identify differences between the RF signal and the sample signal representative of dielectric properties of the produce; determining an estimated quality level of the produce based on the differences between the RF signal and the sample signal; and outputting an indication of the estimated quality level of the produce.

An example method implemented in a data processing system includes transmitting a radio frequency (RF) signal using an RF transmitter disposed at a first side of produce to be monitored for quality, the RF signal being transmitted on a plurality of frequencies; receiving the RF signal using an RF receiver disposed at a second side of the produce opposite the first side, the RF signal having passed through at least a portion of the produce; obtaining a sample signal output by the RF receiver responsive to receiving the RF signal having passed through the at least a portion of the produce; analyzing the sample signal to identify differences between the RF signal and the sample signal representative of dielectric properties of the produce; determining an estimated quality level of the produce based on the differences between the RF signal and the sample signal; and outputting an indication of the estimated quality level of the produce.

An example data processing system according to the disclosure includes a processor and a machine-readable medium storing executable instructions. The instructions when executed cause the processor alone or in combination with other processors to perform operations including monitoring quality of produce at each of a plurality of points along a supply chain by: transmitting a radio frequency (RF) signal using an RF transmitter disposed at a first side of a produce container, the produce container containing produce to be monitored for quality, and the RF signal being transmitted on a plurality of frequencies; receiving the RF signal using an RF receiver disposed at a second side of the produce container, the second side being opposite the first side of the produce container, the RF signal having passed through at least a portion of the produce contained in the produce container; obtaining a sample signal output by the RF receiver responsive to receiving the RF signal having passed through the at least a portion of the produce contained in the produce container; analyzing the sample signal to identify differences between the RF signal and the sample signal representative of dielectric properties of the produce; and determining an estimated quality level of the produce based on the differences between the RF signal and the sample signal. The method further comprises analyzing the estimated quality level of the produce at each of the points along the supply chain to identify potential problems along the supply chain leading to premature ripening and spoilage of the produce; and generating an alert identifying the potential problems and affected produce.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
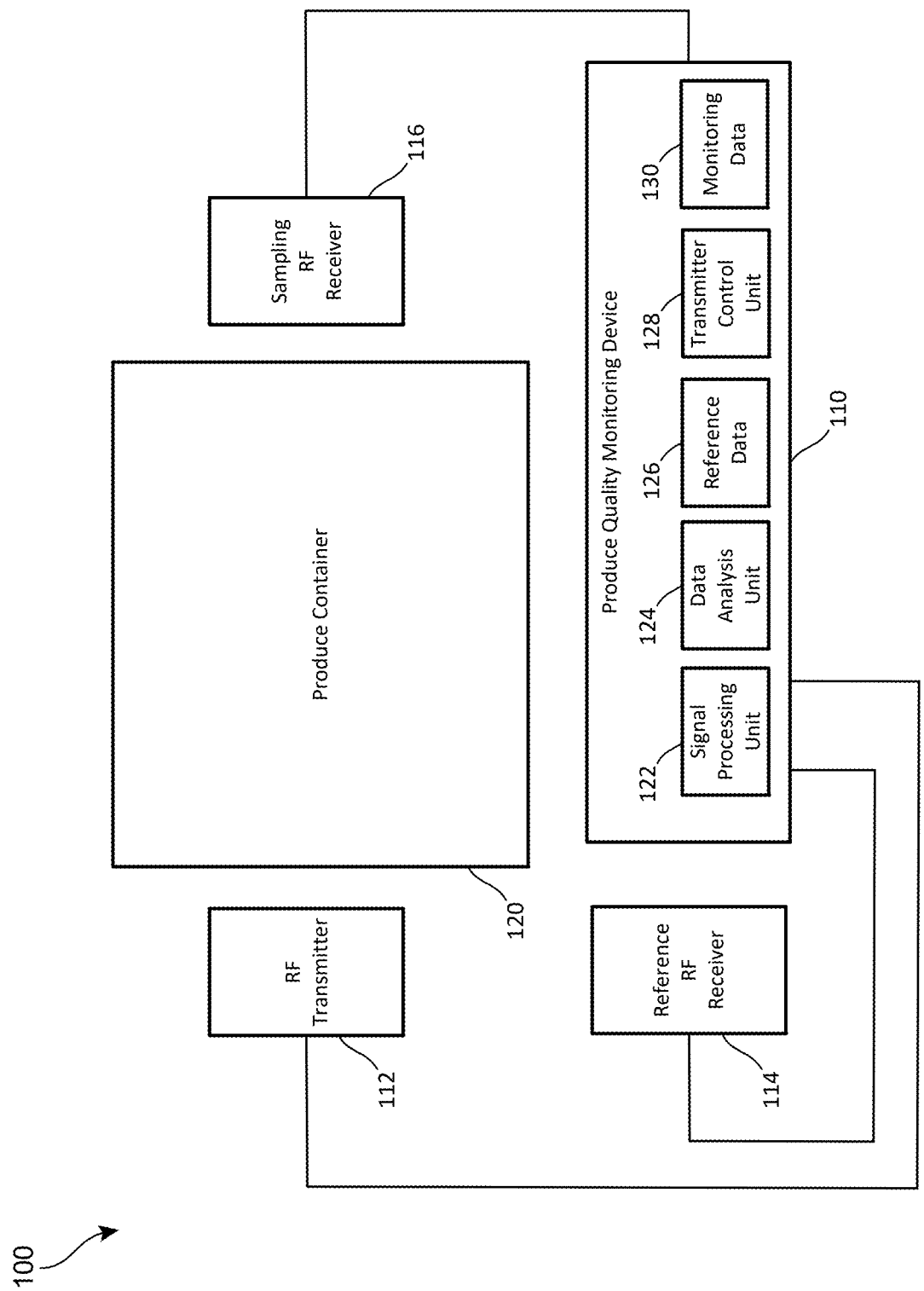
FIG. 1 is a diagram of an example computing environment in which the techniques for monitoring produce quality described herein are implemented.

Systems and methods for monitoring produce quality in the supply chain at the pallet level using wireless signals are provided. These techniques provide a technical solution to the technical problem of monitoring produce quality in the supply chain by using radio frequency (RF) signals to monitor various attributes of the produce, such as but not limited to the dry matter content of the produce representing the water content of the produce, the brix or soluble sugar content of the produce, and/or the titratable acidity of the produce representing the acid content of the produce. Once produce has been harvested, the amount of water contained in the may vary as the produces progresses along its lifecycle. The water content of unripe produce may change as the produce ripens and again as the produce spoils. Changes in the water content and the relative dry matter content of the produce provide one metric that can be used to assess the quality of at least some times of produce. The produce may also undergo other molecular changes, such as but not limited to the transformation of sugars and oils in the produce to other substances. Research has established that monitoring changes in such attributes of produce can be used to assess the quality of the produce along the supply chain. However, current quality testing methods lack the ability to optimally sense changes in these attributes of the produce at scale and at many points along the supply chain. The techniques herein provide a technical solution to these shortcomings by utilizing RF signals to analyze quality of the produce at the pallet level. The RF signals are attenuated differently throughout the lifecycle of the produce due to changes in the dielectric properties of the produce over time. Such changes are frequency dependent. By scanning the produce using multiple frequencies, an accurate prediction of the quality of the produce can be made by comparing the attenuation of the frequencies detected with predetermined fingerprints established through testing of the RF signal attenuation on the types of produce being tested. A technical benefit of this approach is that the testing can be performed at the pallet level or other produce container level, thereby avoiding the sparse sampling problems associated with current quality testing methods. Another technical benefit of this approach is that the cost of the equipment to implement the RF scanning is relatively inexpensive compared with current approaches such as lab testing and the use of hand-held spectrum analyzers. Consequently, the quality testing can be performed more frequently and at more points along the supply chain. Another technical benefit of these techniques is that the techniques herein can be automated, at least in part, along the supply chain to reduce the manual effort required to implement quality testing along the supply chain. The monitoring techniques provided herein do not require that the pallet or other produce container be opened to perform the testing. Yet another technical benefit of these techniques is that these techniques can supplement existing quality testing techniques currently in use along the supply chain to provide even better produce quality monitoring. These and other technical benefits of the techniques disclosed herein will be evident from the discussion of the example implementations that follow.

FIG. 1 is a diagram of an example environment 100 in which the techniques herein may be implemented. The example environment 100 includes a produce quality monitoring device 110. The produce quality monitoring device 110 is associated with an RF transmitter 112, a reference RF receiver 114, and a sampling RF receiver 116. The produce quality monitoring device 110 uses RF transmissions to monitor various attributes of produce to assess the quality of the produce at various points along the supply chain to reduce wastage resulting from spoiled produce. Produce, as used herein, refers to any fresh food product that is subject to degradation in quality from the time that the produce is harvested until the food produce is delivered to the consumer. The produce may include fresh fruits or vegetables, grains, milk and/or other dairy products, and/or other such food products. The produce quality monitoring device 110 uses RF transmissions to monitor changes in various attributes of the produce that are indicative of the quality of the produce. These attributes result in changes in the dielectric properties of the produce as the produce experiences changes from a fresh to a spoiled state. The produce quality monitoring device 110 may be used at various points along the supply chain, such as but not limited to the farms at which the produce is harvested and at various transit, distribution, and/or storage points along the supply chain.

The produce quality monitoring device 110 is associated with the RF transmitter 112, the reference RF receiver 114, and the sampling RF receiver 116. The produce quality monitoring device 110 causes the RF transmitter 112 to transmit an RF signal in one or more frequencies through a produce container 120 that contains the produce to monitored for quality. The sampling RF receiver 116 receives the RF signals that have passed through the produce and returns the received signals to the produce quality monitoring device 110 as sample signals. The produce quality monitoring device 110 analyzes these sample signals according to the techniques provided herein to estimate the quality of the produce in the produce container 120. The reference RF receiver 114 receives a direct path signal from the RF transmitter 112 and provides the received signal to the produce quality monitoring device 110 as a reference signal. The produce quality monitoring device 110 uses this reference signal to identify any external RF signal influences present in the environment 100 in which the produce quality monitoring device 110 is being utilized. The produce quality monitoring device 110 can remove any external influences from the sample signals that may have otherwise skewed the estimates of the quality of the produce. The produce quality monitoring device 110 adjusts attributes of the sample signal to account for attributes of the reference signal not present in the RF signal transmitted by the RF transmitter 112.

The produce container 120 may be a pallet box or other container appropriate for storing the type of produce being monitored. The produce container 120 may be constructed from various types of plastic, cardboard, wood, or other materials that permit the RF transmissions from the RF transmitter 112 to pass through the produce container 120 and the produce contained therein to the sampling RF receiver 116. The produce container 120 may be a stackable container that can be palletized to facilitate transport of the produce.

The produce quality monitoring device 110 passes RF transmissions through the produce to detect changes in various attributes that are indicative of the freshness of the produce. These attributes can include but are not limited to the dry matter content of the produce representing the water content of the produce, the brix or soluble sugar content of the produce, and/or the titratable acidity of the produce representing the acid content of the produce. Changes in these attributes are indicative of changes in the produce that are indicative of decreasing freshness of the produce. The specific attributes that are monitored by the produce quality monitoring device 110 may vary depending upon the type of produce being monitored. For example, changes in the dry matter content of avocados are detectable through changes in the RF signals transmitted through the produce. However, monitoring changes in dry matter content for a liquid dairy product, such as milk, would not be appropriate. Other attributes such as a change in acidity of the liquid dairy product indicative of a degradation in the quality of the liquid dairy product may be utilized instead. Additional details of how the produce quality monitoring device 110 detects changes in the RF signals are discussed in greater detail in the examples which follow.

The produce quality monitoring device 110 is a computing device that may be implemented with various form factors. The produce quality monitoring device 110 may have various form factors, including but not limited to a hand-held dedicated testing device, a mobile phone, a tablet computer, a laptop computer, and/or other such portable devices. A technical benefit of such implementations is that the produce quality monitoring device 110 is portable and relatively expensive, which allows the produce quality monitoring device 110 to be utilized at many points along the supply chain. Consequently, the quality of the produce can be monitored more closely throughout the supply chain to avoid wastage.

The produce container 120 may include a unique identifier that can be used to track the produce container 120 along the supply chain. In some implementations, the produce quality monitoring device 110 includes Radio Frequency Identification (RFID) tag readers, Near Field Communication (NFC) detectors, optical sensors, and/or other types of sensors for reading the identifier from the produce container 120. The produce quality monitoring device 110 can associate the result of monitoring the quality of the produce at various points along the supply chain with this identifier so that the state of the produce at these points along the supply chain can be tracked. The produce quality monitoring device 110 stores the identifier and the status measured in the monitoring data 130. Numerous produce quality monitoring devices 110 may be deployed at various points along the supply chain, and the monitoring data 130 from each of the devices may be uploaded to a supply chain management server (not shown) via network connection.

The produce quality monitoring device 110 can be mounted on or otherwise integrated with equipment used for packaging, storing, moving, and/or otherwise processing the produce along the supply chain so that the identifier of the produce container 120 can be read and the quality of produce at that point along the supply chain measured.

In a non-limiting example, the quality monitoring device 110 is mounted on or otherwise integrated with a forklift, which is used for packing and/or storing the produce at various stages along the supply chain. In another non-limiting example, the quality monitoring device 110 is mounted on or otherwise integrated with a conveyor belt on which produce containers, such as the produce container 120, pass along at some point in the supply chain. The RF transmitter 112, the reference RF receiver 114, and the sampling RF receiver 116 are disposed around the conveyor belt, such that the signal transmitted by the RF transmitter 112 passes through the produce in a produce container currently being scanned. The reference RF receiver 114 receives a direct signal that does not pass through the produce container, while the sampling RF receiver 116 receives the signal that has passed through the produce. A technical benefit of such an approach is that the scanning of the produce can be automated so that the RF transmitter 112, the reference RF receiver 114, and the sampling RF receiver 116 are properly aligned with the produce container 120 to avoid human error in the positioning of the transmitter and receivers relative to the produce container 120. Another technical benefit of this approach is that the quality of the produce can be measured and compared with previous measurements obtained at other points along the supply chain to identify potential problems along the supply chain that are leading to premature spoilage of the produce.

Identifying and eliminating these problems can help to significantly reduce food wastage.

The produce quality monitoring device 110 includes a signal processing unit 122, a data analysis unit 124, reference data 126, and a transmitter control unit 128. The transmitter control unit controls the RF transmitter 112 to transmit a specified RF signal on one or more frequencies. The transmission frequencies are specified in the reference data 126 in some implementations. The produce quality monitoring device 110 includes a user interface that enables a user to specify the type of produce being monitored in some implementations. The signal and frequencies utilized for a particular type of produce may vary, and the transmitter control unit 128 accesses the reference data 126 to determine which signal and/or frequencies to be utilized based on the type of produce.

The signal processing unit 122 is configured to receive the sample signals output by the sampling RF receiver 116 and the reference signals output by the reference RF receiver 114 and to perform preprocessing on the signals before the signals are analyzed by the data analysis unit 124. The signal processing unit 122 may perform various preprocessing on the signals, such as but not limited to adjusting gain, selectivity, and/or performing frequency conversion. In some implementations, the signal processing unit 122 also adjusts the sample signals to remove the reference signals output by the reference RF receiver 114, which removes any environmental interference from the sample signals that could result in a false determination regarding the quality of the produce.

The data analysis unit 124 analyzes the sample signals to determine variations in the sample signals output by the sampling RF receiver 116 from the signals transmitted by the RF transmitter 112. The variations result from the RF signals passing through the produce in the produce container 120. These variations can include amplitude variations due to signal attenuation and/or phase variations due to dispersion. Certain frequencies may be attenuated more than others as certain attributes of the produce change over time. However, measuring changes in attenuation alone to detect changes in quality of the produce in a produce container 120 as the produce container 120 moves through the supply chain is insufficient. The produce in the produce container 120 can become shuffled as the produce container 120 is moved through the supply chain. As a result, the path through the produce measured by the produce quality monitoring device 110 can change, which can cause inconsistent measurements in the attenuation as the produce container 120 moves through the supply chain. To address this problem, the produce quality monitoring device 110 leverages the fact that the speed of different frequencies is affected by the effective path that the signals travel through the produce. Hence, the produce quality monitoring device 110 does not rely on absolute measurements at various frequencies. Instead, the produce quality monitoring device 110 takes a differential slope of time of arrivals from frequencies within a band of frequencies. The differential slope is based on the speed difference between the different frequencies as the various RF signals reach the reference RF receiver 114 and the sampling RF receiver 116.

In some implementations, the produce quality monitoring device 110 is integrated with supply chain management solutions to provide additional information that can be used by the supply chain managers to quickly identify and remedy problems that can lead to food wastage. The produce quality monitoring device 110 may communicate with a supply chain management server over a network connection.

The produce quality monitoring device 110 can provide the monitoring data 130 collected by the produce quality management monitoring device 110 to the server. The server can collect the data from numerous produce quality monitoring devices 110 at various points along the supply chain and analyze this data to generate reports and/or visualizations of the data that can be used to identify points along the supply chain where spoilage is occurring. The reports and visualizations can include information that provides a map of the location of the produce, the type of activities associated with this location including storage and/or transport, and the amount of time that the produce remained at that location. For example, the produce may be subject to incorrect handling and/or storage conditions or may not be processed in an order that prioritizes produce that is likely to spoil before other produce. The supply chain management system can generate alerts to administrators. A technical benefit of this approach is that it provides accountability along the entire supply chain so that these problem points can be addressed to reduce food wastage.

The produce quality monitoring device 110 can be implemented with other form factors. For example, in some implementations, the RF transmitter 112 is implemented separately from the produce quality monitoring device 110. The RF transmitter 112 can be implemented using a Wi-Fi router that has been configured to transmit a plurality of frequencies within one or more frequency bands, such as the 2.4 GHz and the 5 GHz frequency bands. A technical benefit of this approach is that the produce quality monitoring device 110 could be implemented using commonly available smartphones that are capable of detecting Wi-Fi signals. Therefore, the produce quality monitoring device 110 could be implemented by software on the produce quality monitoring device 110 rather than requiring expensive custom hardware. The reference RF receiver 114 could be implemented by a Wi-Fi router or the mobile device. The reference RF receiver 114 could be an antenna that is part of the Wi-Fi router configured to receive a direct path signal from the Wi-Fi router or could be an antenna that is part of the mobile phone. Software on the mobile phone could prompt the user to hold the mobile phone in a first position so that the mobile phone can receive a direct path signal from the Wi-Fi router and a second position so that the smartphone can receive a signal from the Wi-Fi router that passes through the produce.

Figure 2A:
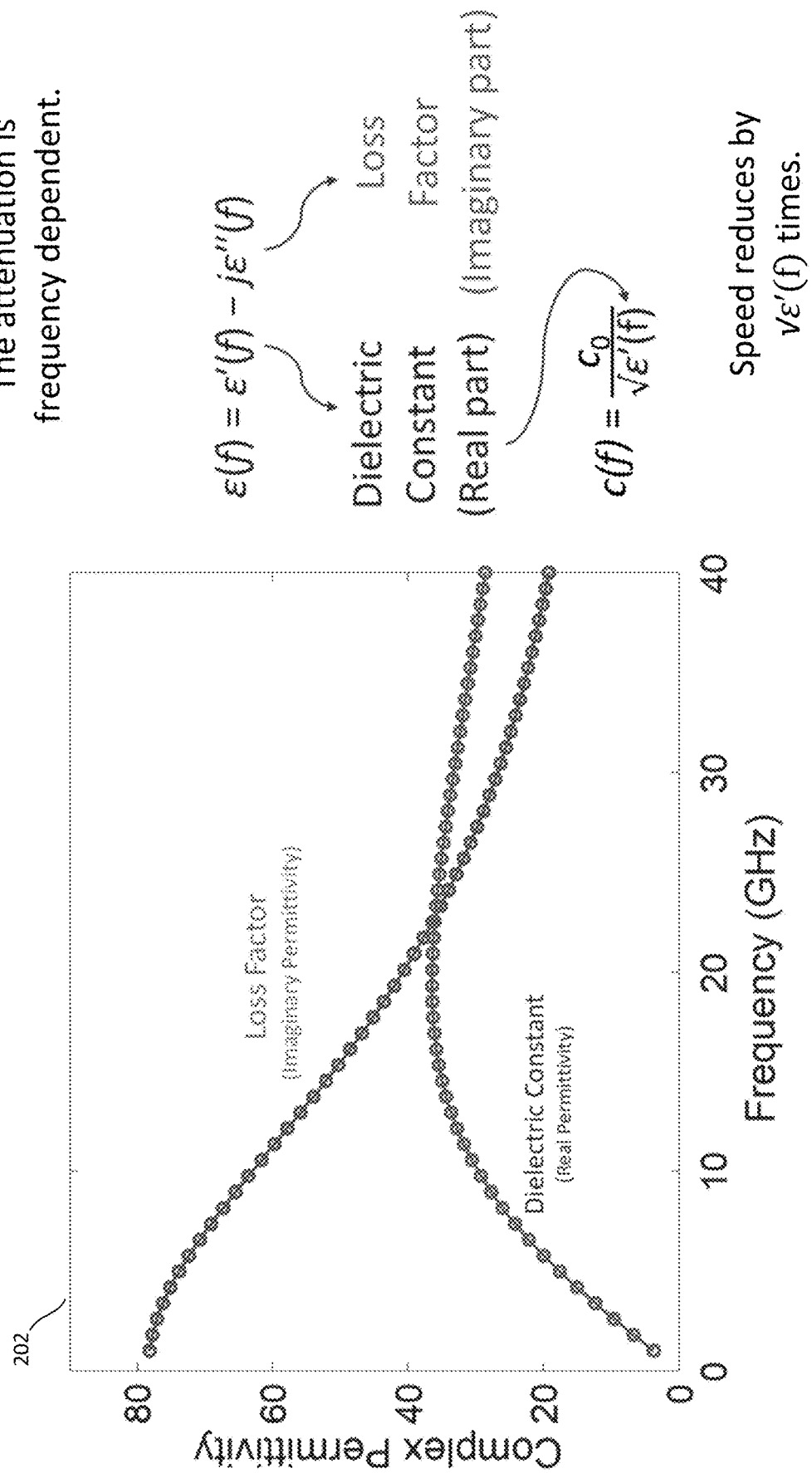
FIG. 2A is a diagram showing an example of the relationship between relative permittivity of the produce through which the RF transmission pass through and frequency of the RF transmissions.

FIG. 2A is a diagram showing the relationship between relative permittivity of the produce through which the RF transmission pass through and frequency of the RF transmissions. The graph 202 shows that the attenuation experienced when the RF signals transmitted by the RF transmitter 112 pass through the produce container 120 and the produce contained therein is frequency dependent. The dielectric permittivity for a particular material for particular frequency f is represented by $\varepsilon(f)$. The dielectric permittivity includes a real part, the dielectric constant component $\varepsilon'(f)$, and an imaginary part, the loss factor $j\varepsilon''(f)$. The speed of the RF signals passing through the produce in the produce container 120 reduces by $\sqrt{\varepsilon'(f)}$, which is the square root of the dielectric constant.

Figure 2B:
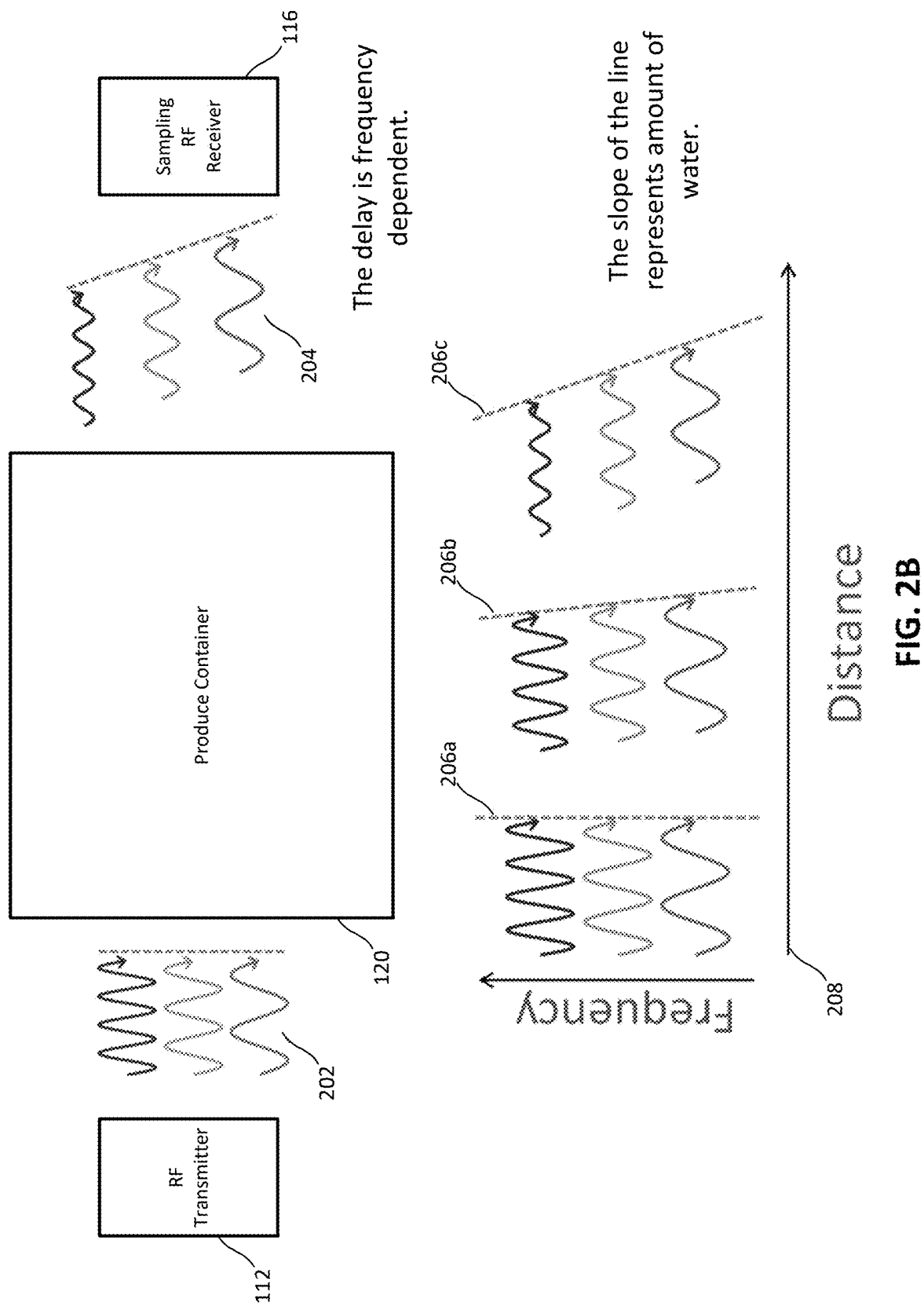
FIG. 2B is a diagram showing the RF transmitter transmitting RF signals at three different frequencies through produce in a produce container.

FIG. 2B is a diagram showing the RF transmitter transmitting RF signals 212 at three different frequencies through the produce in the produce container 120. The RF signals 204 received by the sampling RF receiver 116 experience different delays when passing through the produce in the produce container 120. In the example shown in FIGS. 2A and 2B, the produce being monitored is avocados, and the changes in delays of different frequencies represents changes in the water content of the avocados over time. This loss of water is indicative of a decrease in quality of the avocados. The graph 208 demonstrates how the decreasing water content of the avocados indicates results in changes in the delays associated with each of the frequencies. The slope is determined at each of the three times 206*a*, 206*b*, and 206*c* in this example implementation. The slope of the line changes as the amount of water decreases. The slope of the line can be used as one factor for predicting the quality of the avocados at a particular time. This slope information can be stored in the reference data 126 for various types of produce and used by the produce quality monitoring device 110 to predict the quality of similar produce.

Figure 3A:
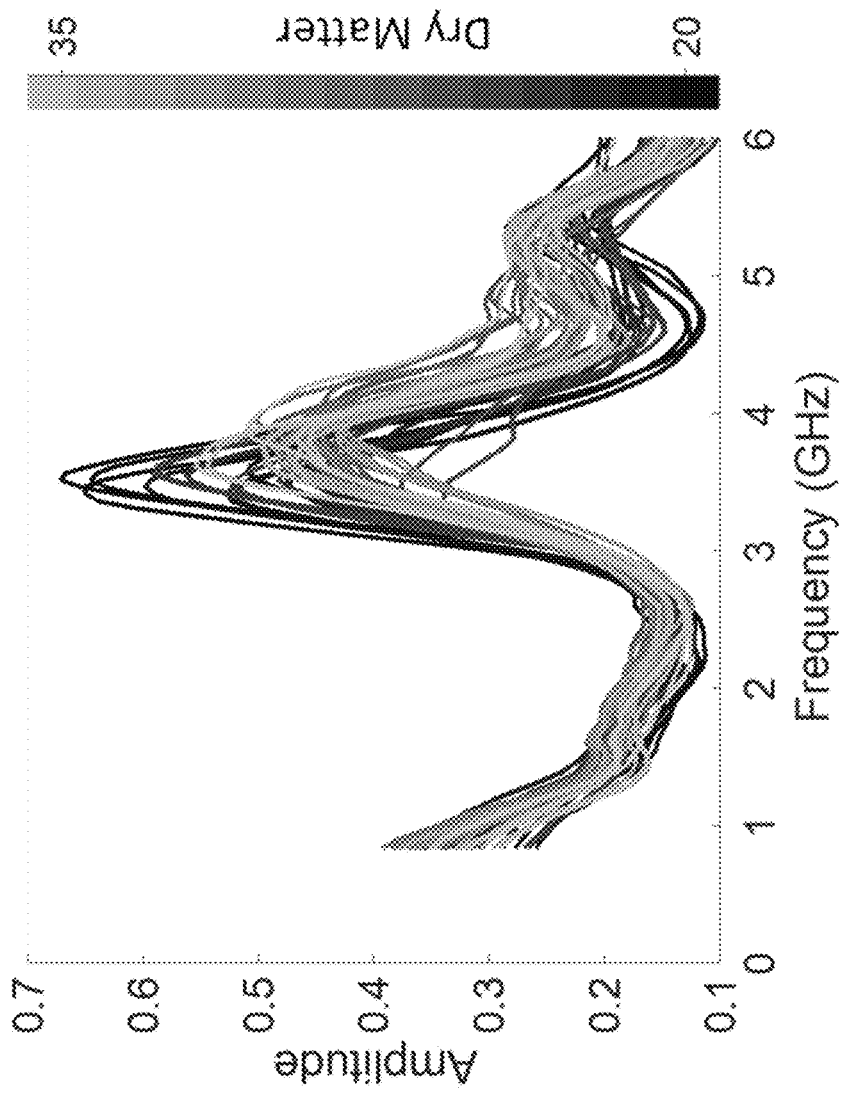
FIG. 3A is a chart that shows an example of amplitude variations in sample signals measured by the sampling RF receiver due to variations in dry matter content of produce.

FIG. 3A is a chart that shows an example of amplitude variations in the sample signals measured by the sampling RF receiver 116 due to variations in dry matter content of avocados. The amplitudes measured at certain frequencies change as the avocados lose water and the dry matter content of the avocados increases. These changes represent changes in the ripeness of the avocados over time and can be used to track the quality of the avocados along the supply chain. However, as discussed above, the use of the amplitude alone is insufficient for tracking the quality of the avocados as they travel along the supply chain, because the produce may be shifted or shuffled around in the produce container 120 as the produce is moved along the supply chain. Furthermore, the RF transmitter 112 and the sampling RF receiver 116 would need to be aligned exactly so that the same path through the produce is measured each time. Otherwise, the amplitude variations may vary based on the path that the RF signals take through the produce.

Figure 3B:
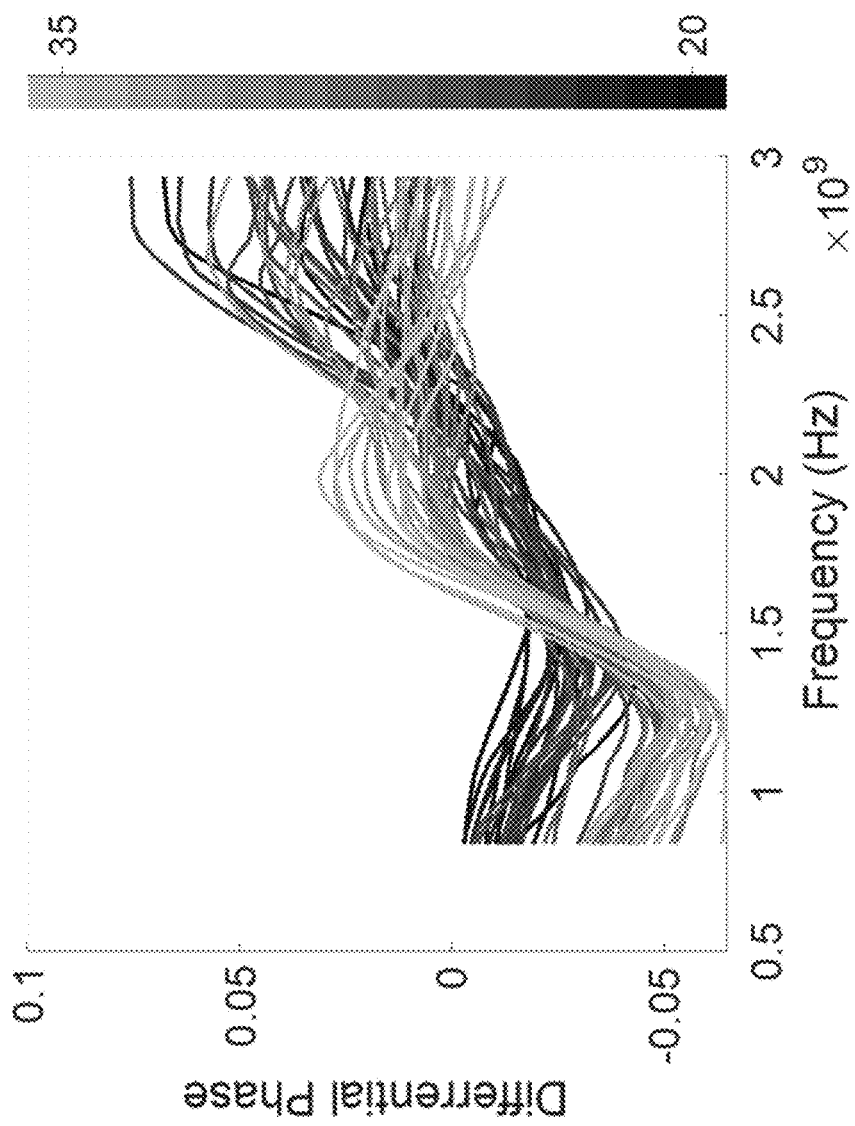
FIG. 3B is a chart that shows an example of phase differentials experienced at different frequencies due to variations in dry matter content of the produce from the example implementation shown in FIG. 3A.

To address these issues, phase variation measurements are used. FIG. 3B is a chart that shows an example of phase differentials experienced at different frequencies due to variations in dry matter content of the avocados from the example implementation shown in FIG. 3A. As discussed in the preceding examples, phase variations provide a more reliable metric for measuring changes in the dry matter content of the avocados as the produce containers 120 containing the avocados move along the supply chain, because a slope of the line of the phase variations can be plotted at various points along the supply chain as shown in FIG. 2B. This approach does not rely on absolute measurements but instead relies on the relative measurements of the phase changes at various points along the supply chain. Movement of the produce within the produce container 120, changes in the relative positions of the RF transmitter 112 and the sampling RF receiver 116 relative to the produce container 120, and changes in the environment do not impact these relative measurements in the same way as the absolute measurements of the amplitude shown in FIG. 2A.

Figure 4A:
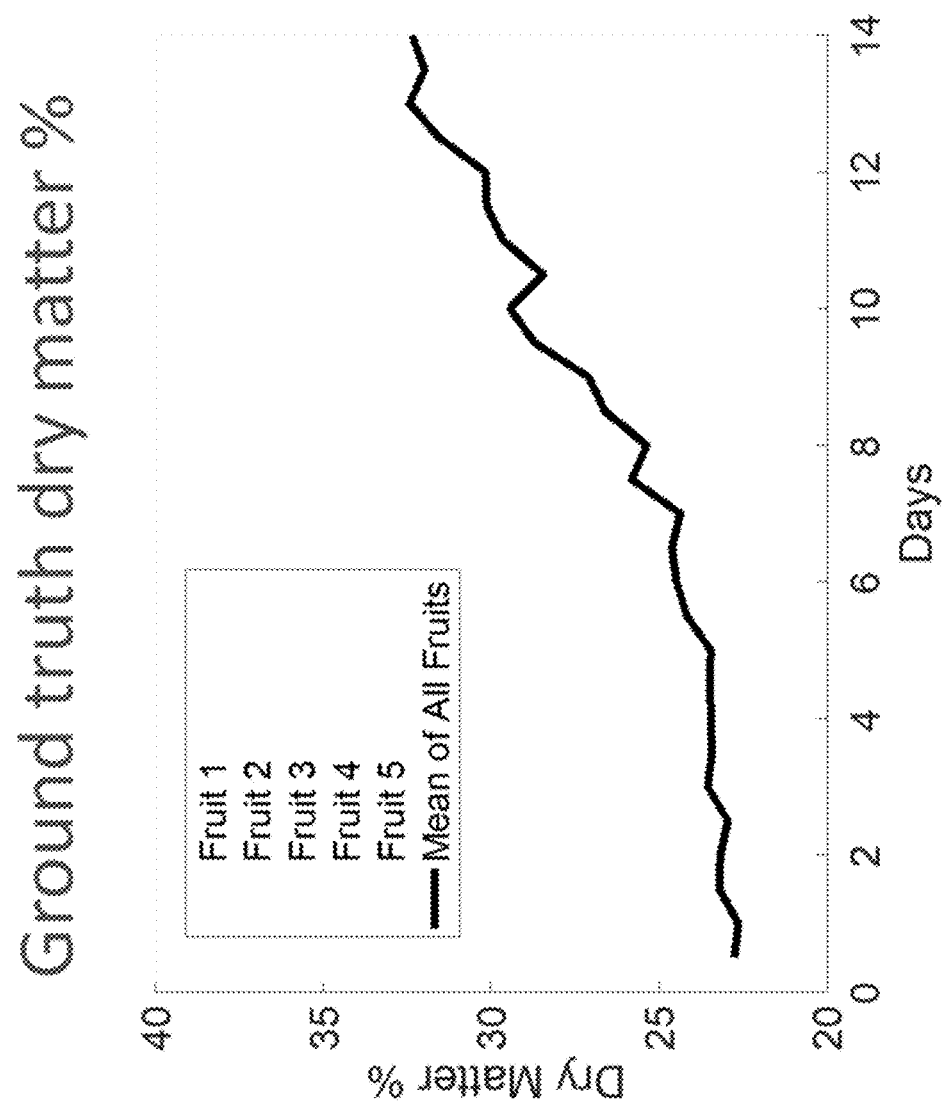
FIG. 4A is a chart that shows example ground truth dry matter percentages for avocados captured using a spectrometer.

FIG. 4A is a chart that shows example ground truth dry matter percentages. The dry matter percentages were measured for a set of test avocados and the plot represents the mean of the dry matter percentage of the set of the test avocados. The dry matter percentage measurements were obtained using a hand-held near infrared (NIR) spectrometer commonly used in the industry to perform quality testing on produce. As discussed in the preceding examples, such devices are expensive compared with the techniques provided herein and require manual intervention by a human to perform the testing. Therefore, the techniques provided herein could be deployed to more points along the supply chain and utilized more frequently because the techniques provided herein can be automated. The ground truth data obtained from the NIR spectrometer was used to create a regression model. FIGS. 4B, 4C, 5A, and 5B demonstrate that both amplitude and phase variations can be used to predict the condition of produce such as avocados.

Figure 4B:
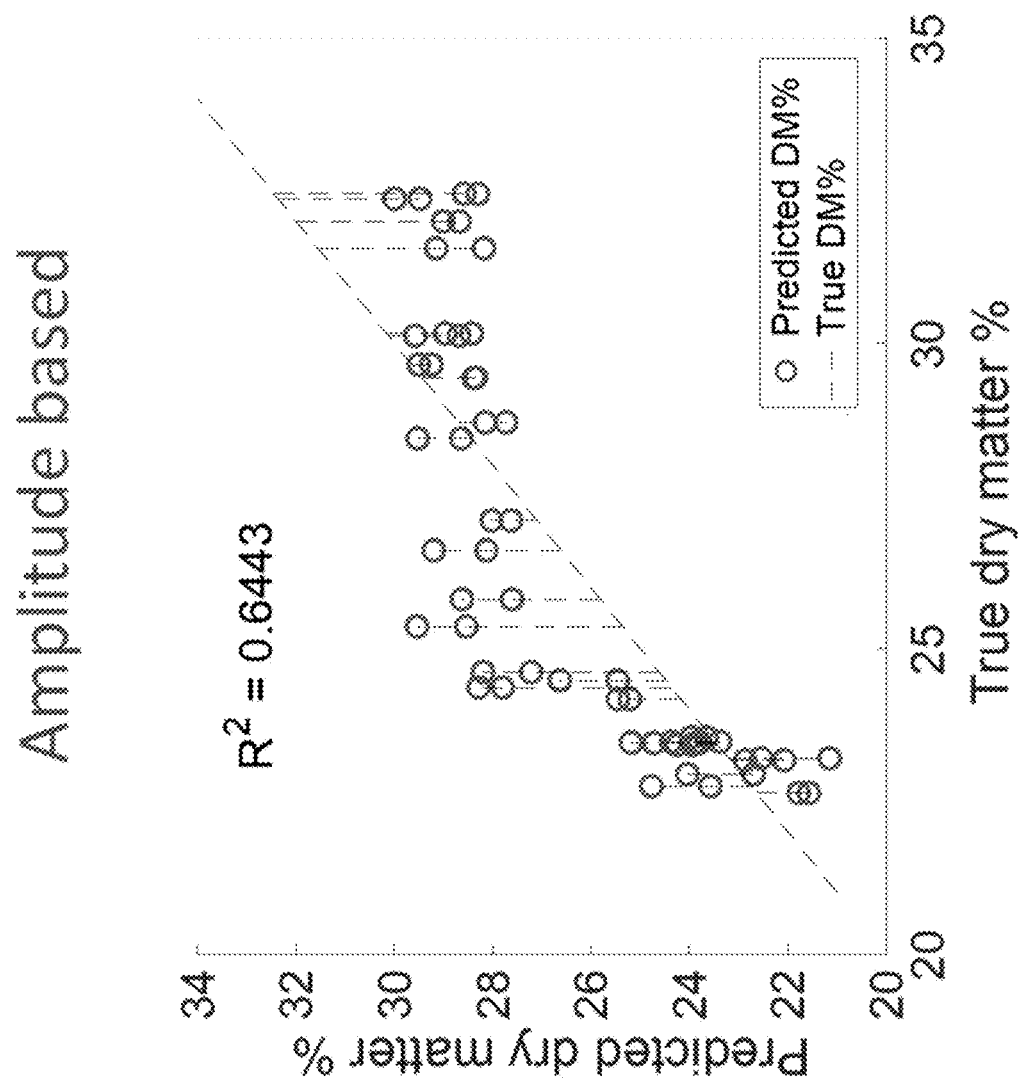
FIG. 4B is an example chart that shows a comparison of the true dry matter percentage obtained using the spectrometer compared with the predicted dry matter percentage based on amplitude.
Figure 4C:
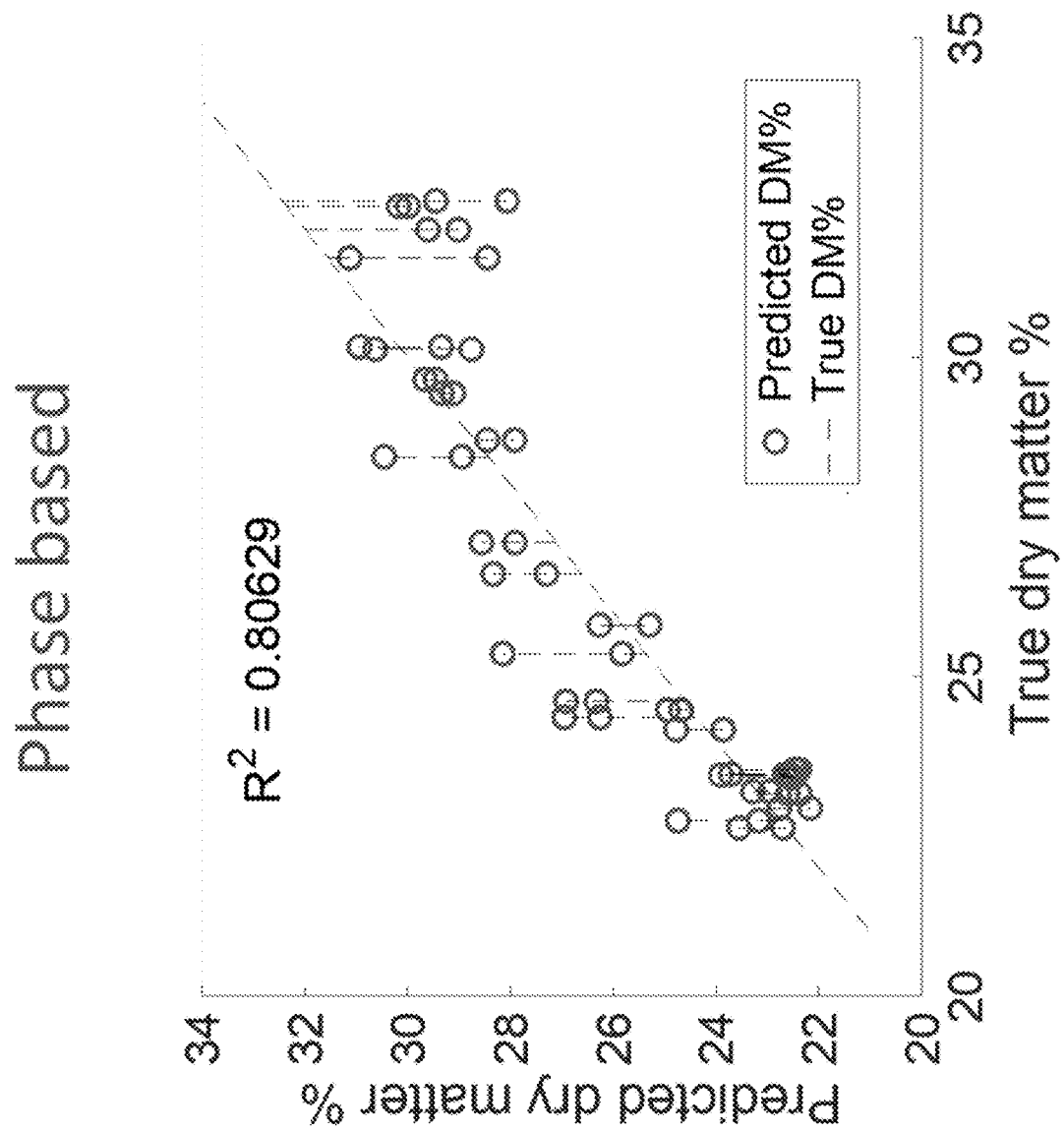
FIG. 4C is an example chart that shows a comparison of the true dry matter percentages compared with predicted dry matter percentages based on phase.

FIG. 4B is a chart that shows the true dry matter percentage obtained using the NIR spectrometer compared with the predicted dry matter percentage based on amplitude. The coefficient of determination ($R^2$) for the amplitude-based predictions was 0.6443, which shows that changes in the dry matter percentage of the avocados can be estimated using the amplitude-based method. FIG. 4C is a chart showing the true dry matter percentages compared with predicted dry matter percentages based on phase. The coefficient of determination ($R^2$) for the phase-based predictions was 0.80629, which shows that changes in the dry matter percentage of the avocados can also be estimated using the phase-based method and that the phase-based method provides results that more closely fit the model.

Figure 5A:
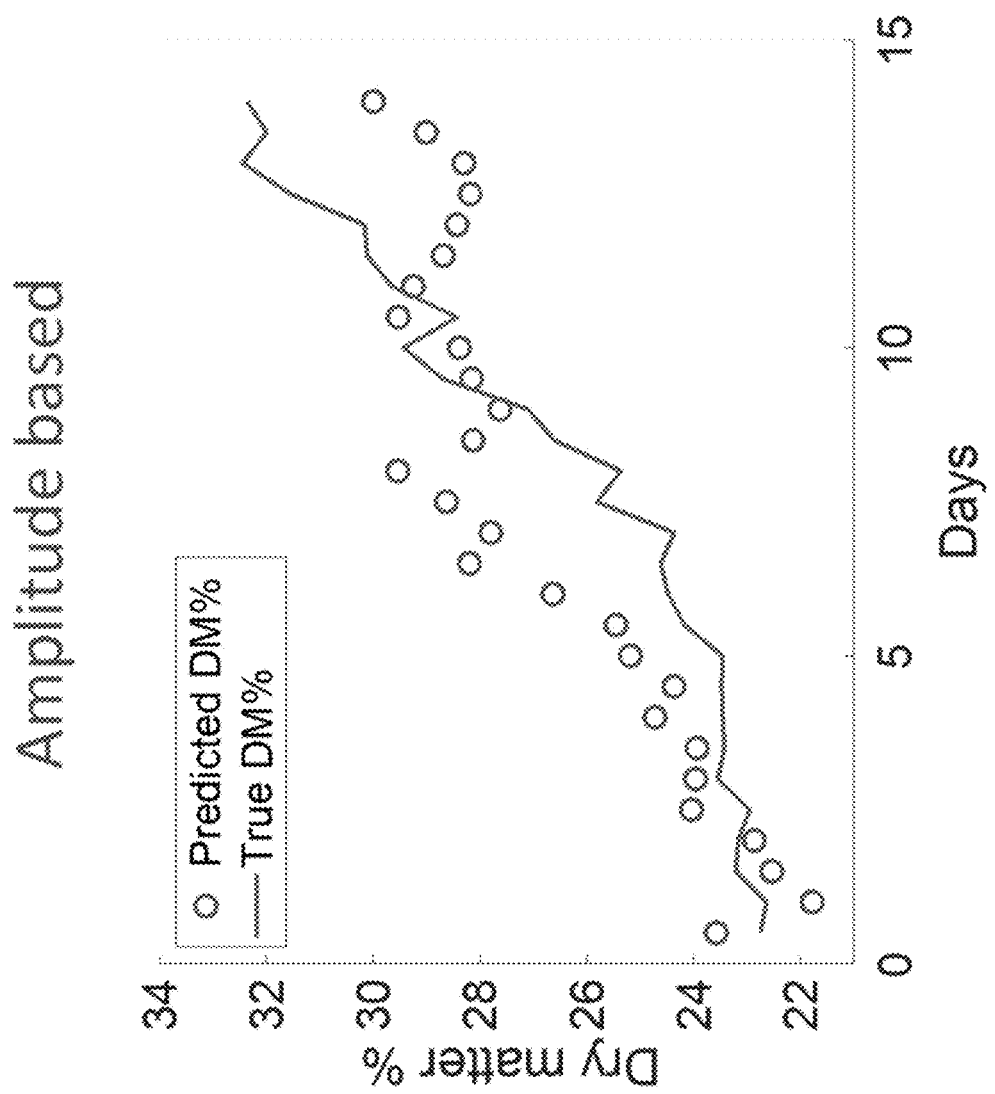
FIG. 5A is an example chart that provides a comparison of the true dry matter percentages and the predicted dry matter percentage over a number of days for the avocados from the examples in FIGS. 4A-4C.
Figure 5B:
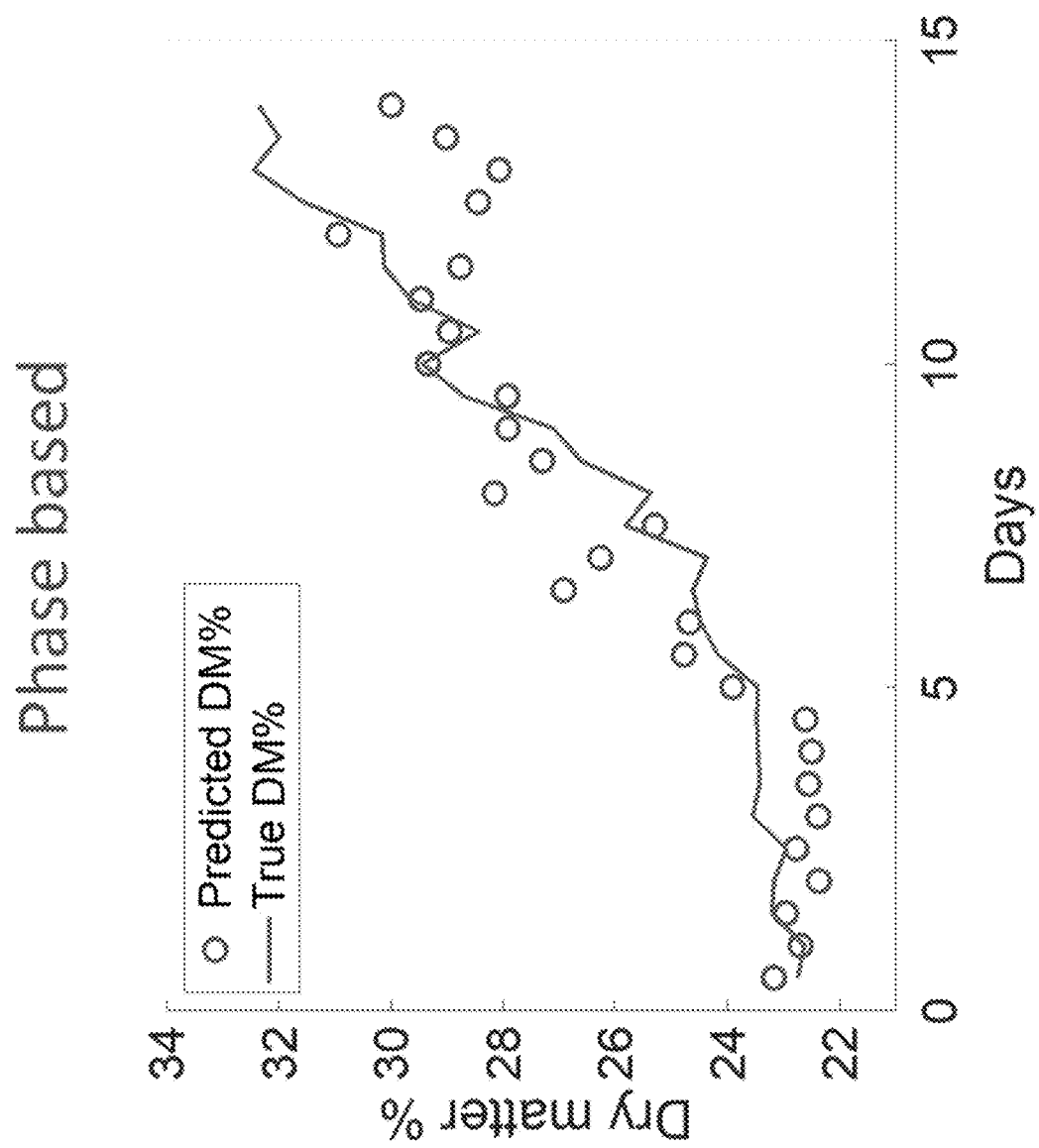
FIG. 5B is an example chart that provides a comparison of the true dry matter percentages and the predicted dry matter percentage over a number of days for the avocados from the examples in FIGS. 4A-4C.

FIG. 5A is a chart that provides an example comparison of the true dry matter percentages and the predicted dry matter percentage over a number of days for the avocados from the examples in FIGS. 4A-4C. The predicted dry matter percentages in FIG. 5A are determined using the amplitude-based approach. FIG. 5B is a chart that provides an example comparison of the true dry matter percentages and the predicted dry matter percentage over a number of days for the avocados from the examples in FIGS. 4A-4C. The predicted dry matter percentages in FIG. 5B are determined using the phase-based approach. Both the amplitude-based approach and the phase-based approach can be used to predict the quality of the avocados as the avocadoes transition from an unripe to ripe to spoiled state over time. The phase-based approach can provide a more accurate assessment of the quality of the produce as the produce moves through the supply chain, because the phase-based approach relies on the relative delays associated with each of the frequencies transmitted by the RF transmitter 112 each time the quality of the produce is measured. Thus, the phase-based approach is not impacted by the produce moving within the produce container 120 and/or the positions of the RF transmitter 112 and/or the sampling RF receiver 116 relative to the produce container 120 not being exactly the same each time measurements are taken.

While the examples discussed above with respect to FIGS. 2A-5B discuss performing quality testing on avocados, the techniques herein are not limited to a specific type of produce. These techniques can be extended to various types of produce, including fresh fruits or vegetables, grains, milk and/or other dairy products, and/or other such food products.

Figure 6A:
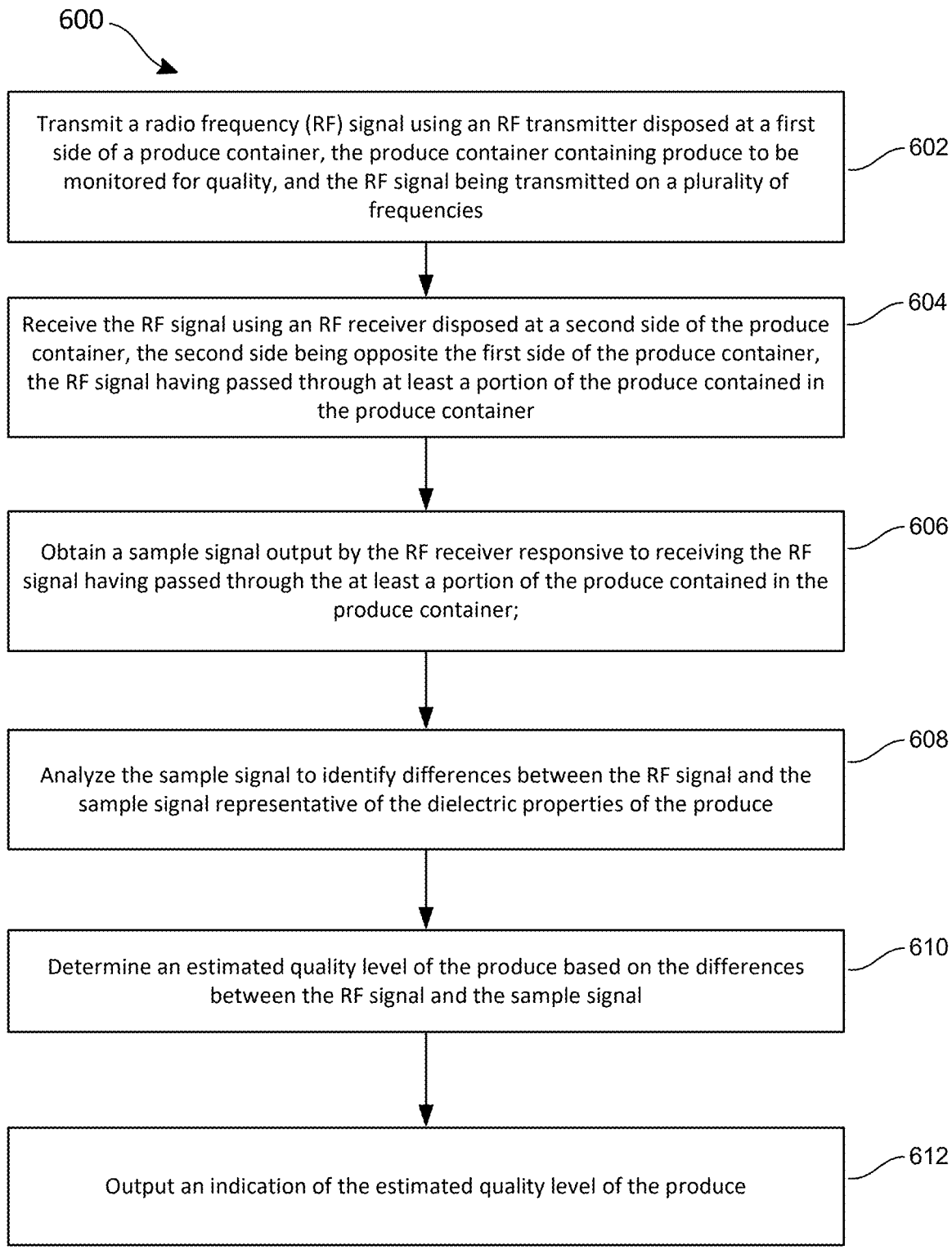
FIG. 6A is a flow chart of an example process for monitoring produce quality according to the techniques disclosed herein.

FIG. 6A is a flow chart of an example process 600 for monitoring produce quality according to the techniques disclosed herein. The process 600 can be implemented by the produce quality monitoring device 110 shown in the preceding examples.

The process 600 includes an operation 602 of transmitting a radio frequency (RF) signal using an RF transmitter 112 disposed at a first side of a produce container 120. The produce container 120 contains produce to be monitored for quality. As discussed in the preceding examples, the RF signal is transmitted on a plurality of frequencies, which facilitates amplitude-based and phase-based determinations of the quality of the produce based on the dielectric properties of the produce, according to the techniques disclosed herein.

The process 600 includes an operation 604 of receiving the RF signal using an RF receiver 116 disposed at a second side of the produce container 120. The second side of the produce container 120 being opposite the first side of the produce container 120. The RF signal passes through at least a portion of the produce contained in the produce container 120. As shown at least in FIG. 1, the RF transmitter 112 and the sampling RF receiver 116 are disposed on opposites sides of a pallet or other produce container to cause the RF signal transmitted by the RF transmitter 112 to pass through the produce.

The process 600 includes an operation 606 of obtaining a sample signal output by the RF receiver 116 responsive to receiving the RF signal having passed through at least a portion of the produce contained in the produce container. As discussed in the preceding examples, the sampling RF receiver 116 outputs a sample signal based on the RF signal received at the RF receiver 116.

The process 600 includes an operation 608 of analyzing the sample signal to identify differences between the RF signal and the sample signal representative of the dielectric properties of the produce and an operation 610 of determining an estimated quality level of the produce based on the differences between the RF signal and the sample signal. As discussed in the preceding examples, the produce quality monitoring device 110 can make amplitude-based and phase-based determinations of the quality of the produce based on the dielectric properties of the produce, according to the techniques disclosed herein. The produce quality monitoring device 110 can compare the amplitude and/or phase-related impacts on various frequencies of the RF signal to the reference data 126 to determine the estimated quality level of the produce. The reference data 126 includes reference data that indicates expected amplitude and/or phase impacts on various frequencies of the RF signal at different points in the lifecycle of the produce. These impacts change as the produce moves from a fresh to spoiled state and can be used to predict where the produce is on its lifecycle.

The process 600 includes an operation 612 of outputting an indication of the estimated quality level of the produce. The produce quality monitoring device 110 includes a user interface in some implementations that presents the indication of the estimated quality level of the produce. Such implementations may be useful where the produce quality monitoring device 110 is used as a handheld device for testing containers of produce or mounted on or integrated with equipment where the quality level of the produce is monitored by a human user. In other implementations, the indication of the estimated quality level of the produce is stored in the monitoring data 130 in a memory of the produce quality monitoring device 110. The produce quality monitoring device 110 may then transmit this data to a computer system for analysis and/or upload the indication of the estimated quality to a supply chain management server.

Figure 6B:
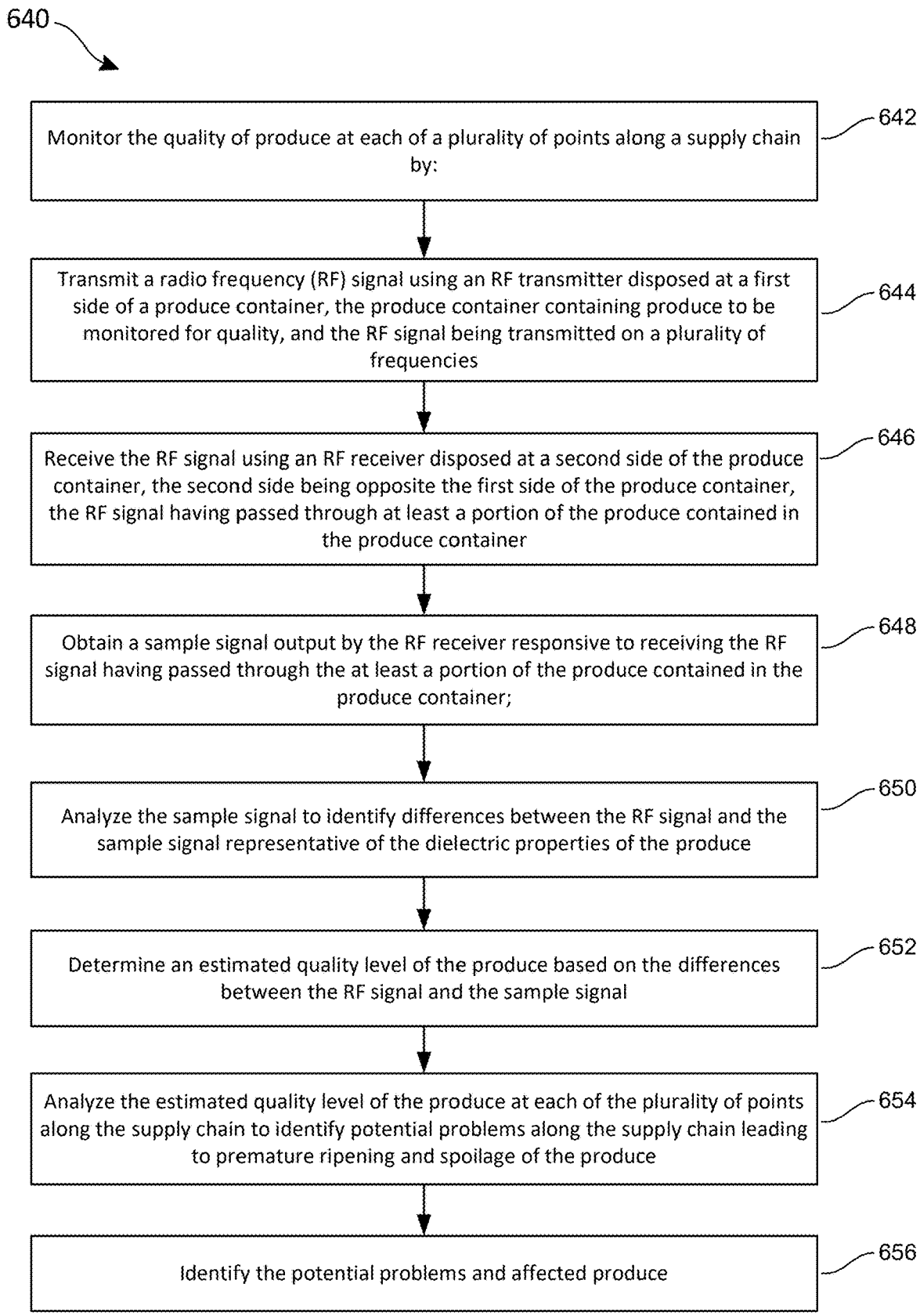
FIG. 6B is a flow chart of another example process for monitoring produce quality according to the techniques disclosed herein.

FIG. 6B is a flow chart of another example process 640 for monitoring produce quality, according to the techniques disclosed herein. The process 600 can be implemented in part by the produce quality monitoring device 110 shown in the preceding examples and by a supply chain system which utilizes the measurements taken by the produce quality monitoring device 110 at various points along the supply chain.

The process 640 includes an operation 642 of monitoring the quality of produce at each of a plurality of points along a supply chain using the operations 644, 646, 648, 650, and 652. The operations 644, 646, 648, 650, and 652 are similar to those performed by the produce quality monitoring device 110 in the process 600 shown in FIG. 6A.

The process 640 includes an operation 644 of transmitting a radio frequency (RF) signal using an RF transmitter 112 disposed at a first side of a produce container 120. The produce container 120 contains produce to be monitored for quality. As discussed in the preceding examples, the RF signal is transmitted on a plurality of frequencies, which facilitates amplitude-based and phase-based determinations of the quality of the produce based on the dielectric properties of the produce.

The process 640 includes an operation 646 of receiving the RF signal using an RF receiver 16 disposed at a second side of the produce container 120. The second side of the produce container 120 being opposite the first side of the produce container 120. The RF signal passes through at least a portion of the produce contained in the produce container 120. As shown at least in FIG. 1, the RF transmitter 112 and the sampling RF receiver 116 are disposed on opposites sides of a pallet or other produce container to cause the RF signal transmitted by the RF transmitter 112 to pass through the produce.

The process 640 includes an operation 648 of obtaining a sample signal output by the RF receiver responsive to receiving the RF signal having passed through at least a portion of the produce contained in the produce container. As discussed in the preceding examples, the sampling RF receiver 116 outputs a sample signal based on the RF signal received at the RF receiver 116.

The process 640 includes an operation 650 of analyzing the sample signal to identify differences between the RF signal and the sample signal representative of the dielectric properties of the produce and an operation 652 of determining an estimated quality level of the produce based on the differences between the RF signal and the sample signal. As discussed in the preceding examples, the produce quality monitoring device 110 can make amplitude-based and phase-based determinations of the quality of the produce based on the dielectric properties of the produce according to the techniques disclosed herein. The produce quality monitoring device 110 can compare the amplitude and/or phase-related impacts on various frequencies of the RF signal to the reference data 126 to determine the estimated quality level of the produce. The reference data 126 can include reference data that indicates expected amplitude and/or phase impacts on various frequencies of the RF signal at different points in the lifecycle of the produce. These impacts change as the produce moves from a fresh to spoiled state and can be used to predict where the produce is on its lifecycle.

The process 640 includes an operation 654 of analyzing the estimated quality level of the produce at each of the points along the supply chain to identify potential problems along the supply chain leading to premature ripening and spoilage of the produce and an operation 656 of generating an alert identifying the potential problems and affected produce. The supply chain management system can analyze the estimated quality levels at each of the points along the supply chain to identify problems that can lead to food wastage. For example, the produce may be subject to incorrect handling and/or storage conditions or may not be processed in an order that prioritizes produce that is likely to spoil before other produce. By identifying the points along the supply chain where the produce tends to exhibit significant changes in quality, these points along the supply chain can be investigated to try to resolve such problems.

Figure 6C:
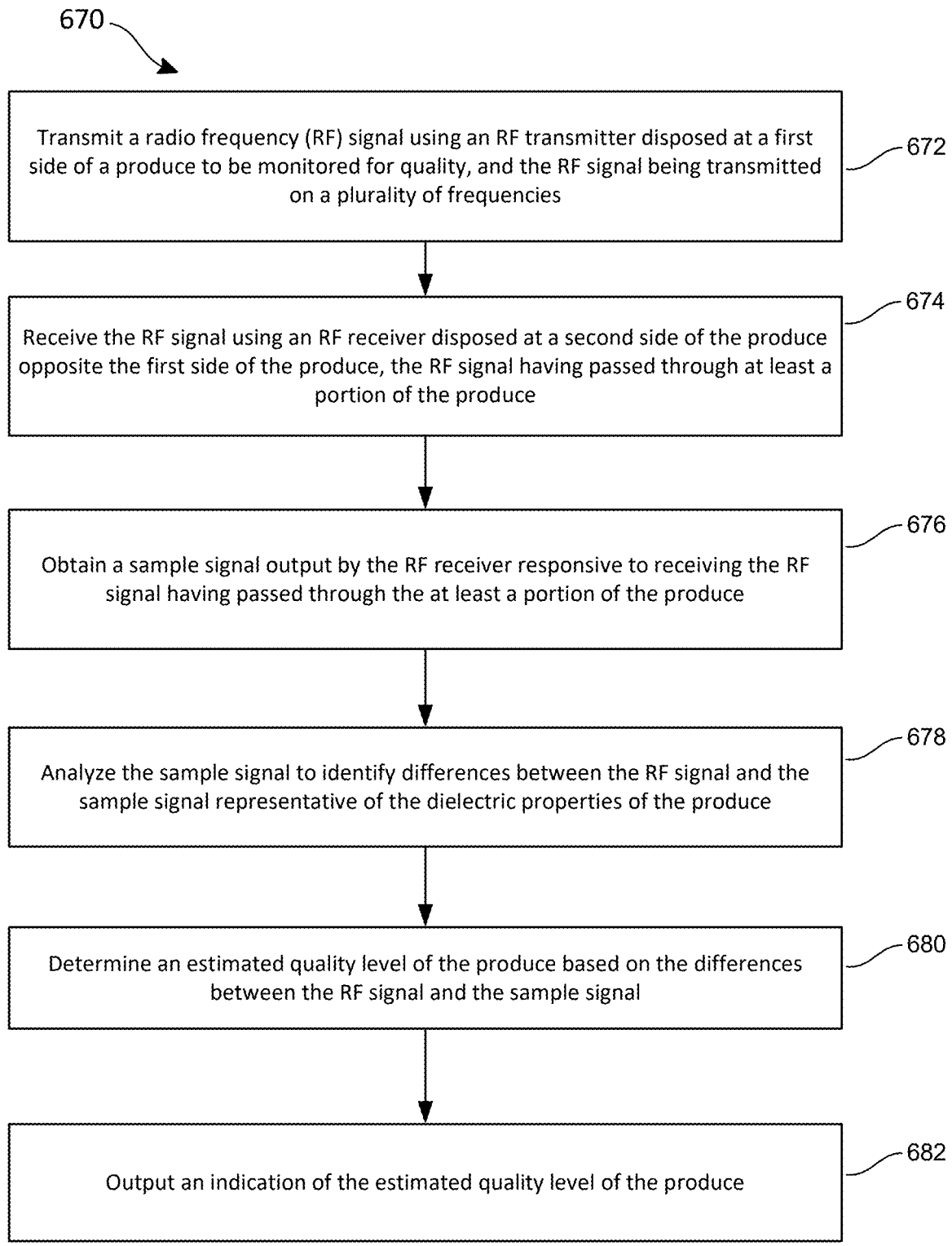
FIG. 6C is a flow chart of another example process for monitoring produce quality according to the techniques disclosed herein.

FIG. 6C is a flow chart of an example process 670 for monitoring produce quality according to the techniques disclosed herein. The process 670 can be implemented by the produce quality monitoring device 110 shown in the preceding examples.

The process 670 includes an operation 672 of transmitting a radio frequency (RF) signal using an RF transmitter 112 disposed at a first side of a produce to be monitored for quality. The produce may be stored in a produce container 120 as discussed in the preceding examples. As discussed in the preceding examples, the RF signal is transmitted on a plurality of frequencies, which facilitates amplitude-based and phase-based determinations of the quality of the produce based on the dielectric properties of the produce, according to the techniques disclosed herein.

The process 670 includes an operation 674 of receiving the RF signal using an RF receiver 116 disposed at a second side of the produce opposite the first side of the produce. The RF signal passes through at least a portion of the produce. As shown at least in FIG. 1, the RF transmitter 112 and the sampling RF receiver 116 are disposed on opposites sides of the produce. If the produce is stored in a produce container, then the RF transmitter 112 and the sampling RF receiver 116 are disposed on opposite sides of a pallet or other produce container to cause the RF signal transmitted by the RF transmitter 112 to pass through the produce.

The process 670 includes an operation 676 of obtaining a sample signal output by the RF receiver 116 responsive to receiving the RF signal having passed through at least a portion of the produce. As discussed in the preceding examples, the sampling RF receiver 116 outputs a sample signal based on the RF signal received at the RF receiver 116.

The process 670 includes an operation 678 of analyzing the sample signal to identify differences between the RF signal and the sample signal representative of the dielectric properties of the produce and an operation 680 of determining an estimated quality level of the produce based on the differences between the RF signal and the sample signal. As discussed in the preceding examples, the produce quality monitoring device 110 can make amplitude-based and phase-based determinations of the quality of the produce based on the dielectric properties of the produce, according to the techniques disclosed herein. The produce quality monitoring device 110 can compare the amplitude and/or phase-related impacts on various frequencies of the RF signal to the reference data 126 to determine the estimated quality level of the produce. The reference data 126 includes reference data that indicates expected amplitude and/or phase impacts on various frequencies of the RF signal at different points in the lifecycle of the produce. These impacts change as the produce moves from a fresh to spoiled state and can be used to predict where the produce is on its lifecycle.

The process 670 includes an operation 682 of outputting an indication of the estimated quality level of the produce. The produce quality monitoring device 110 includes a user interface in some implementations that presents the indication of the estimated quality level of the produce. Such implementations may be useful where the produce quality monitoring device 110 is used as a handheld device for testing containers of produce or mounted on or integrated with equipment where the quality level of the produce is monitored by a human user. In other implementations, the indication of the estimated quality level of the produce is stored in the monitoring data 130 in a memory of the produce quality monitoring device 110. The produce quality monitoring device 110 may then transmit this data to a computer system for analysis and/or upload the indication of the estimated quality to a supply chain management server.

The detailed examples of systems, devices, and techniques described in connection with FIGS. 1-6C are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6C are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
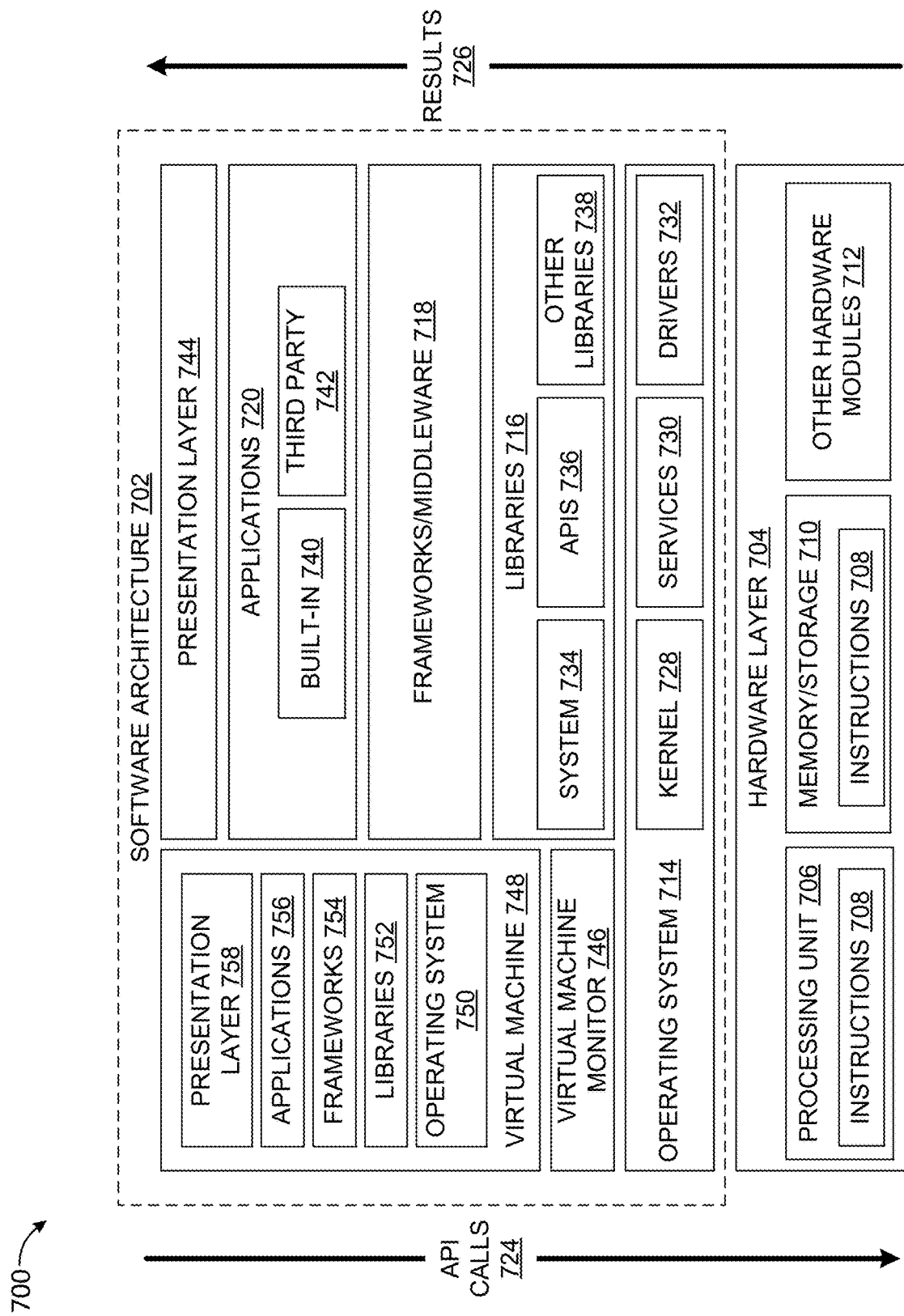
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
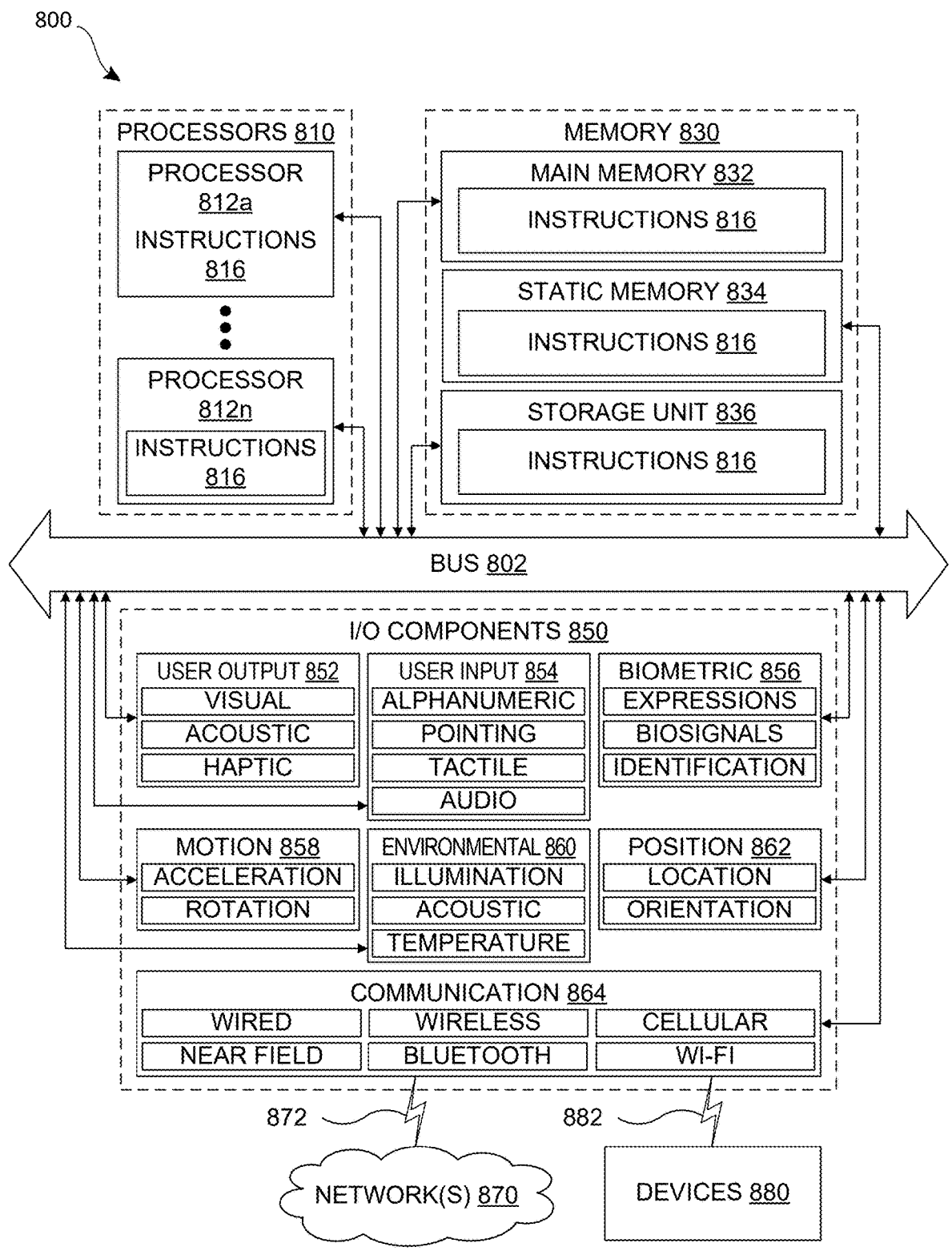
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a singly disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor alone or in combination with other processors to perform operations of:
      transmitting a radio frequency (RF) signal using an RF transmitter disposed at a first side of a produce container, the produce container containing produce to be monitored for quality, and the RF signal being transmitted on a plurality of frequencies;
      receiving the RF signal using an RF receiver disposed at a second side of the produce container, the second side being opposite the first side of the produce container, the RF signal having passed through at least a portion of the produce contained in the produce container;
      obtaining a sample signal output by the RF receiver responsive to receiving the RF signal having passed through the at least a portion of the produce contained in the produce container;
      analyzing the sample signal to identify differences between the RF signal and the sample signal representative of dielectric properties of the produce;
      determining an estimated quality level of the produce based on the differences between the RF signal and the sample signal; and
      outputting an indication of the estimated quality level of the produce.

2. The data processing system of claim 1, wherein determining an estimated quality level of the produce based on the differences between the RF signal and the sample signal further comprises:
   comparing the differences between the RF signal and the sample signal with reference information to determine the estimated quality level of the produce, the reference information comprising sample data collected by transmitting the RF signal through examples of the produce at various levels of freshness.

3. The data processing system of claim 1, wherein determining an estimated quality level of the produce based on the differences between the RF signal and the sample signal further comprises:
   determining an attenuation of one or more frequencies of the plurality of frequencies of the RF signal due to dielectric properties of the produce; and
   determining the estimated quality level of the produce based on the attenuation of one or more frequencies of the RF signal.

4. The data processing system of claim 1, wherein determining an estimated quality level of the produce based on the differences between the RF signal and the sample signal further comprises:
   determining a delay associated with one or more frequencies of the plurality of frequencies of the RF signal; and
   determining the estimated quality level of the produce based on the delay associated with the one or more frequencies of the RF signal.

5. The data processing system of claim 4, wherein the machine-readable medium further includes instructions configured to cause the processor alone or in combination with the other processors to perform operations of:
   determining a slope of a line plotted according to the delays associated with the one or more frequencies; and
   determining the estimated quality level of the produce based on the slope of the line.

6. The data processing system of claim 1, wherein outputting the indication of the estimated quality level of the produce further comprises:
   outputting the indication of the estimated quality level of the produce on a user interface of the data processing system.

7. The data processing system of claim 1, wherein outputting the indication of the estimated quality level of the produce further comprises:
   storing the indication of the estimated quality level of the produce and an identifier associated with the produce container in a memory of the data processing system; and
   transmitting the indication of the estimated quality level of the produce and the identifier associated with the produce container to a supply chain management server over a network connection.

8. The data processing system of claim 1, wherein the machine-readable medium further includes instructions configured to cause the processor alone or in combination with the other processors to perform operations of:
   selecting the plurality of frequencies based on a type of produce to be monitored for quality.

9. The data processing system of claim 1, wherein the machine-readable medium further includes instructions configured to cause the processor alone or in combination with the other processors to perform operations of:
   selecting the frequencies based on an attribute of the produce to be monitored.

10. The data processing system of claim 1, wherein the machine-readable medium further includes instructions configured to cause the processor alone or in combination with the other processors to perform operations of:
    receiving the RF signal using a reference RF receiver to obtain a reference signal, the reference RF receiver being disposed relative to the RF transmitter such that the RF signal transmitted by the RF receiver does not pass through the produce or the produce container; and
    modifying the sample signal to remove attributes of the reference signal not present in the RF signal transmitted by the RF transmitter to remove external influences from the sample signal.

11. A method implemented in a data processing system for monitoring produce quality, the method comprising:
    transmitting a radio frequency (RF) signal using an RF transmitter disposed at a first side of produce to be monitored for quality, the RF signal being transmitted on a plurality of frequencies;
    receiving the RF signal using an RF receiver disposed at a second side of the produce opposite the first side, the RF signal having passed through at least a portion of the produce;
    obtaining a sample signal output by the RF receiver responsive to receiving the RF signal having passed through the at least a portion of the produce;
    analyzing the sample signal to identify differences between the RF signal and the sample signal representative of dielectric properties of the produce;

determining an estimated quality level of the produce based on the differences between the RF signal and the sample signal; and outputting an indication of the estimated quality level of the produce.

12. The method of claim 11, wherein the produce is contained in a produce container, wherein the RF transmitter is disposed at a first side of the produce container, and wherein the RF receiver is disposed at a second side of the produce container, the RF signal having passed through at least a portion of the produce contained in the produce container.

13. The method of claim 11, wherein determining an estimated quality level of the produce based on the differences between the RF signal and the sample signal further comprises:

comparing the differences between the RF signal and the sample signal with reference information to determine the estimated quality level of the produce, the reference information comprising sample data collected by transmitting the RF signal through examples of the produce at various levels of freshness.

14. The method of claim 11, wherein determining an estimated quality level of the produce based on the differences between the RF signal and the sample signal further comprises:

determining an attenuation of one or more frequencies of the plurality of frequencies of the RF signal due to dielectric properties of the produce; and determining the estimated quality level of the produce based on the attenuation of one or more frequencies of the RF signal.

15. The method of claim 11, wherein determining an estimated quality level of the produce based on the differences between the RF signal and the sample signal further comprises:

determining a delay associated with one or more frequencies of the plurality of frequencies of the RF signal; and determining the estimated quality level of the produce based on the delay associated with the one or more frequencies of the RF signal.

16. The method of claim 15, further comprising:

determining a slope of a line plotted according to the delays associated with the one or more frequencies; and determining the estimated quality level of the produce based on the slope of the line.

17. A data processing system comprising:

a processor; and a machine-readable medium storing executable instructions that, when executed, cause the processor alone or in combination with other processors to perform operations of:

monitoring quality of produce at each of a plurality of points along a supply chain by:

transmitting a radio frequency (RF) signal using an RF transmitter disposed at a first side of a produce container, the produce container containing produce to be monitored for quality, and the RF signal being transmitted on a plurality of frequencies;

receiving the RF signal using an RF receiver disposed at a second side of the produce container, the second side being opposite the first side of the produce container, the RF signal having passed through at least a portion of the produce contained in the produce container;

obtaining a sample signal output by the RF receiver responsive to receiving the RF signal having passed through the at least a portion of the produce contained in the produce container;

analyzing the sample signal to identify differences between the RF signal and the sample signal representative of dielectric properties of the produce; and determining an estimated quality level of the produce based on the differences between the RF signal and the sample signal;

analyzing the estimated quality level of the produce at each of the plurality of points along the supply chain to identify potential problems along the supply chain leading to premature spoilage of the produce; and generating an alert identifying the potential problems and affected produce.

18. The data processing system of claim 17, wherein determining an estimated quality level of the produce based on the differences between the RF signal and the sample signal further comprises:

comparing the differences between the RF signal and the sample signal with reference information to determine the estimated quality level of the produce, the reference information comprising sample data collected by transmitting the RF signal through examples of the produce at various levels of freshness.

19. The data processing system of claim 17, wherein determining an estimated quality level of the produce based on the differences between the RF signal and the sample signal further comprises:

determining an attenuation of one or more frequencies of the plurality of frequencies of the RF signal due to dielectric properties of the produce; and determining the estimated quality level of the produce based on the attenuation of one or more frequencies of the RF signal.

20. The data processing system of claim 17, wherein determining an estimated quality level of the produce based on the differences between the RF signal and the sample signal further comprises:

determining a delay associated with one or more frequencies of the plurality of frequencies of the RF signal; and determining the estimated quality level of the produce based on the delay associated with the one or more frequencies of the RF signal.

* * * * *